Patented May 3, 1927.

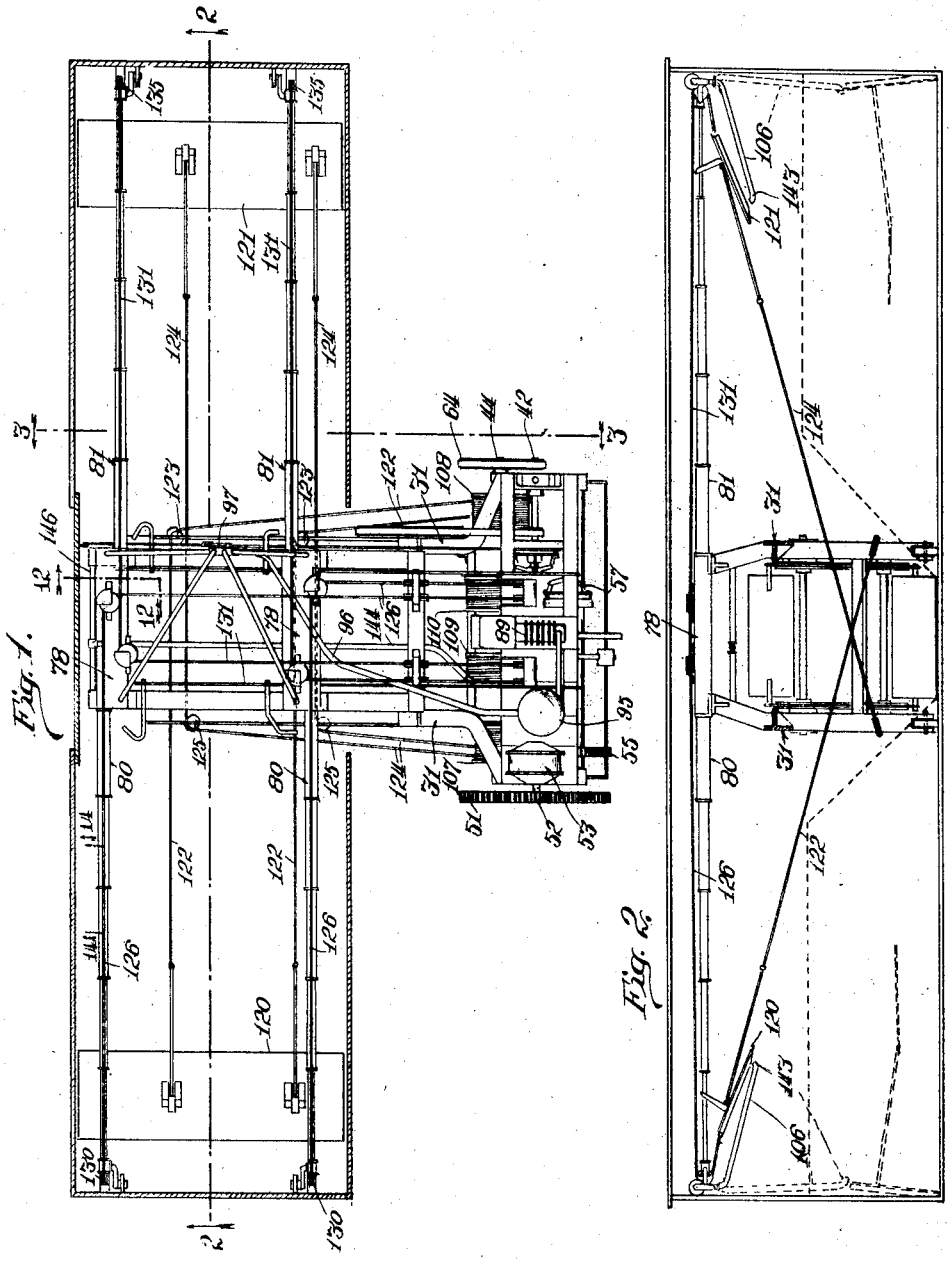

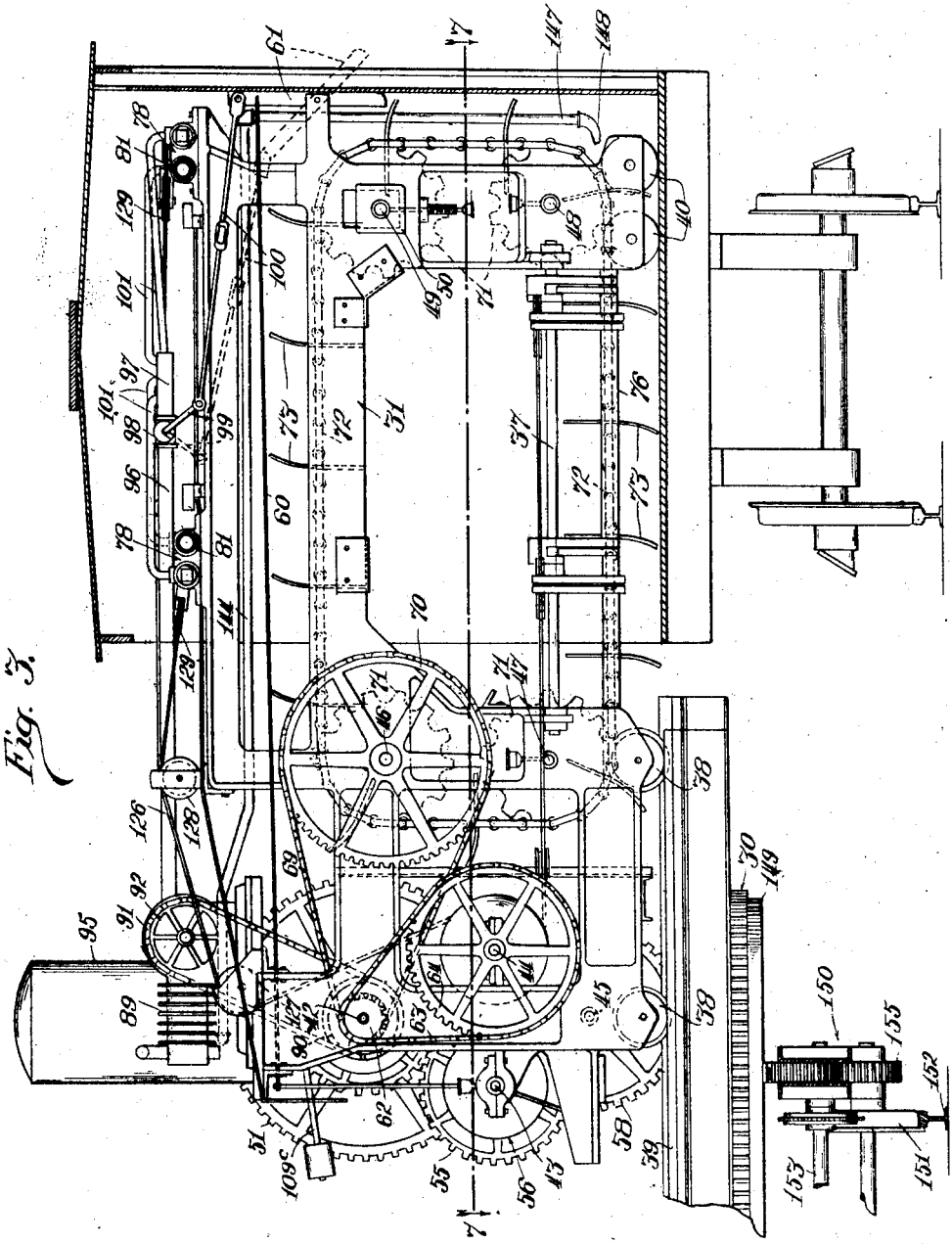

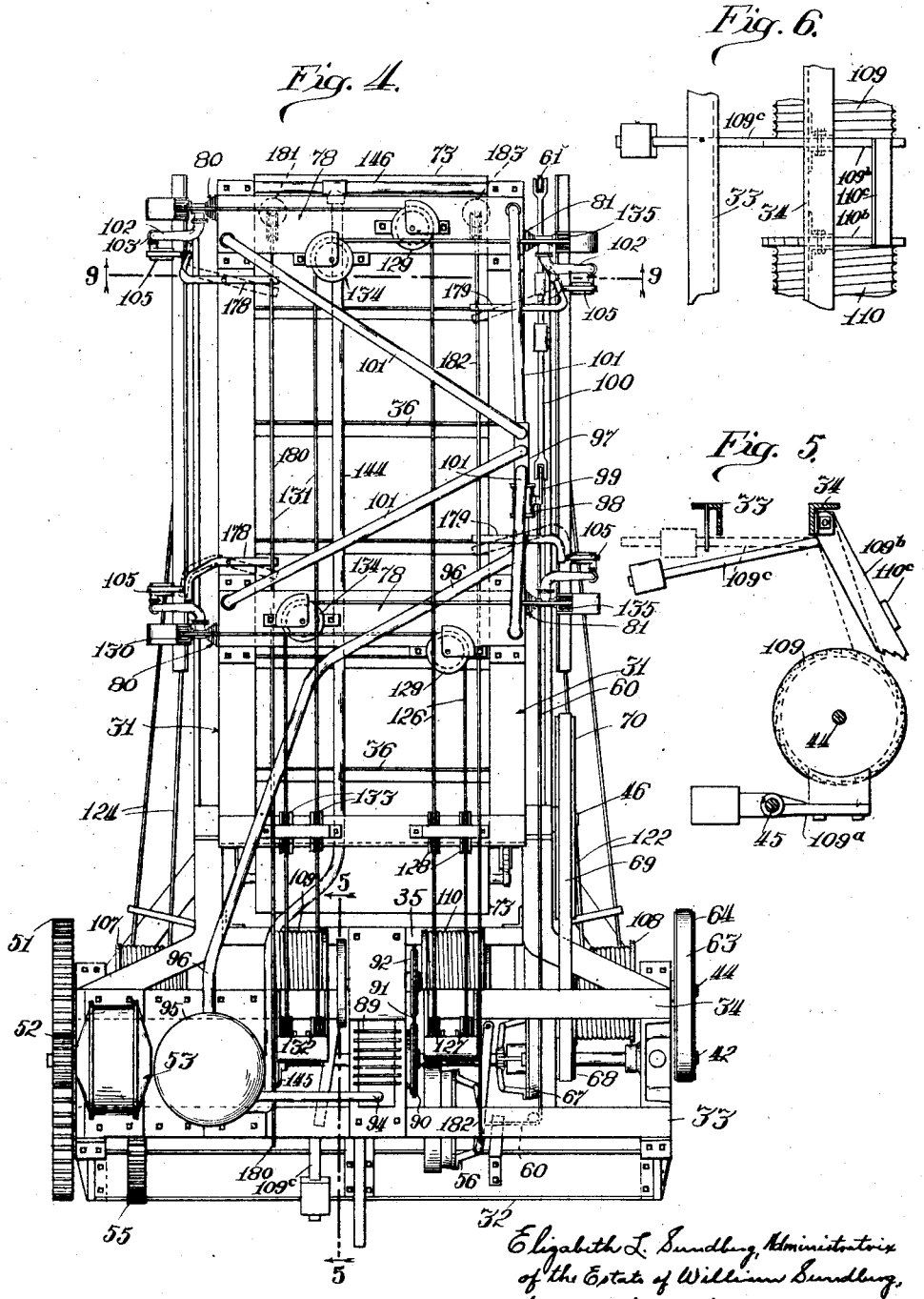

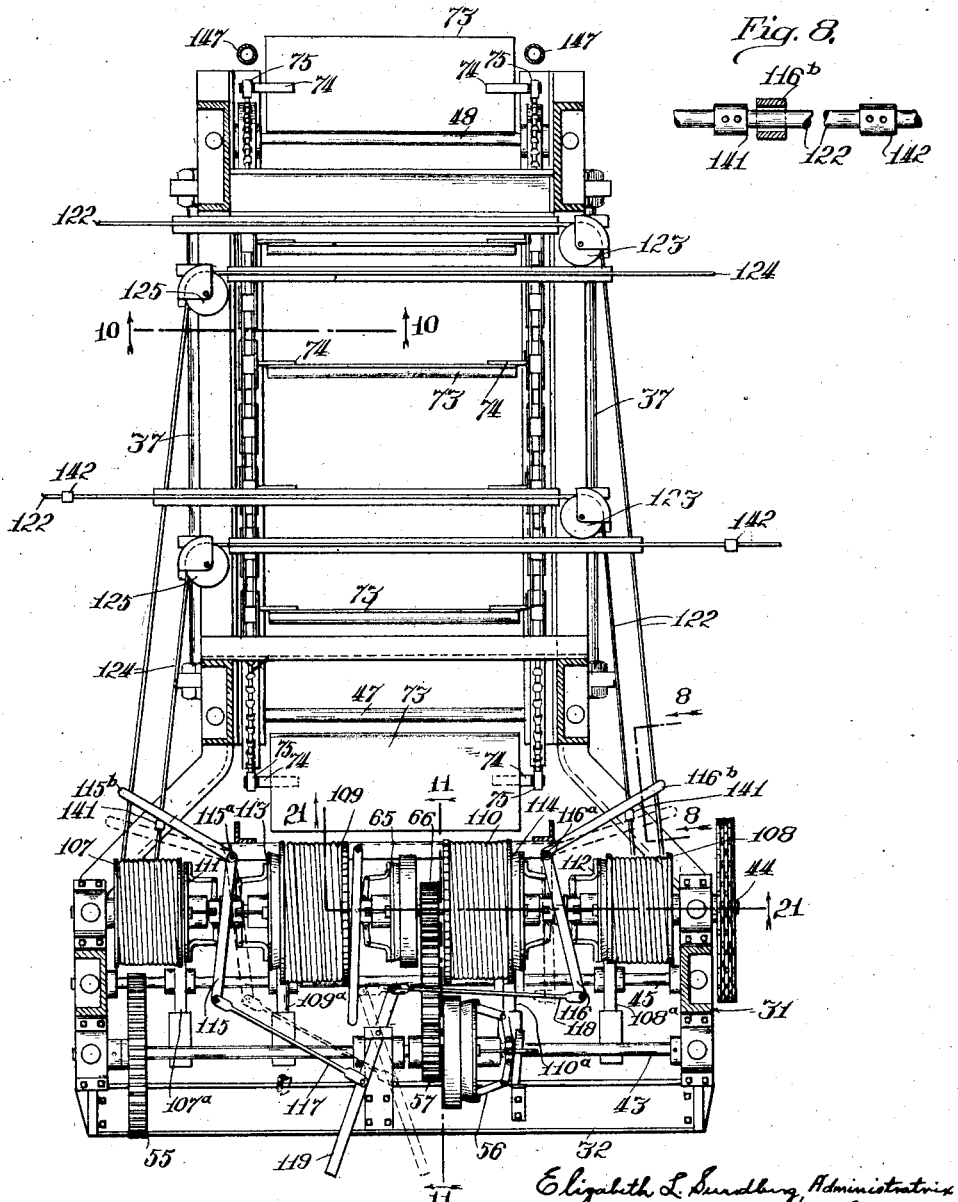

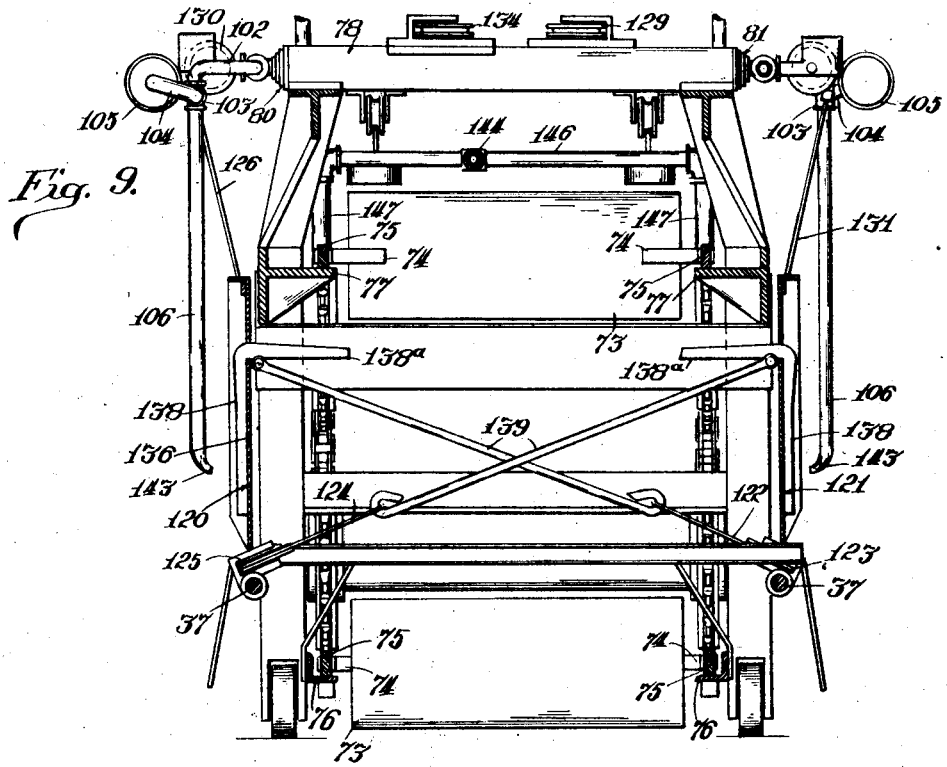

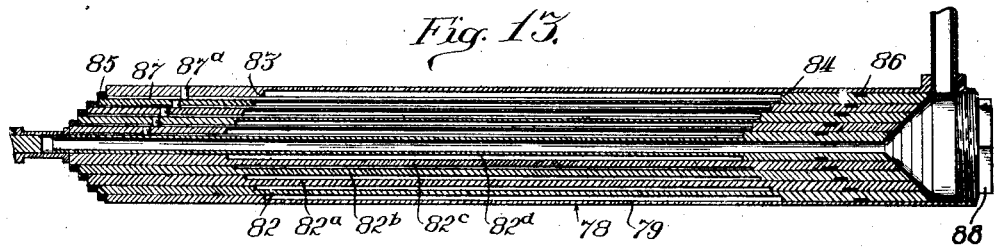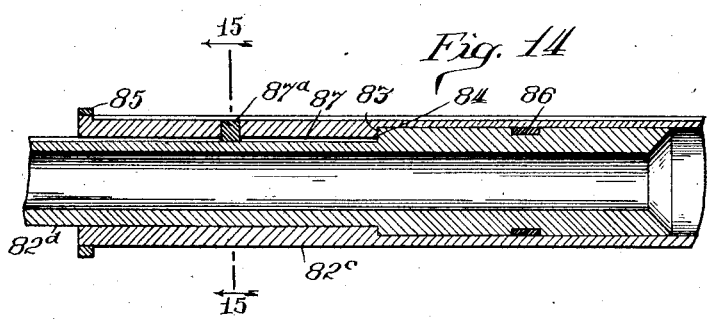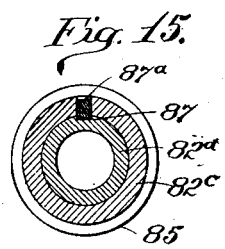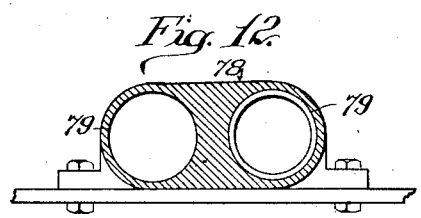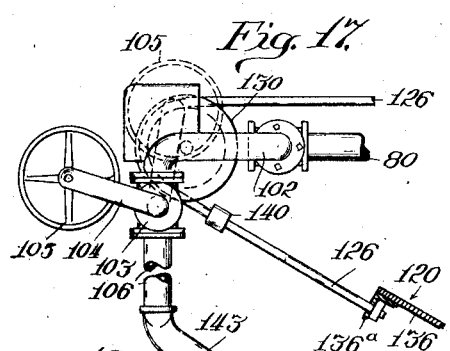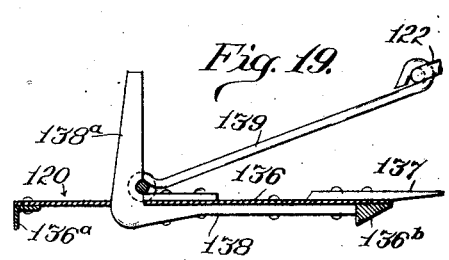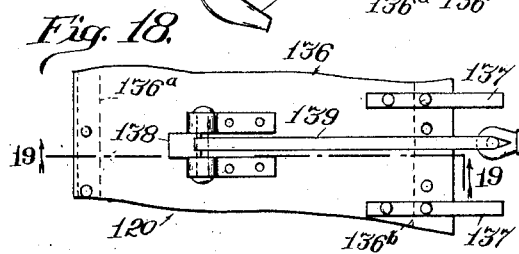

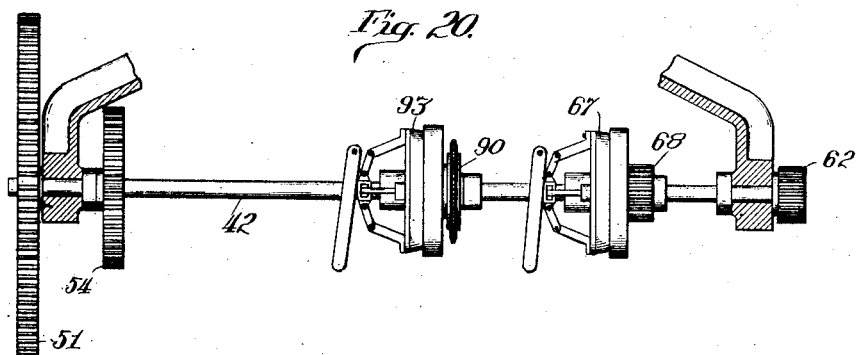
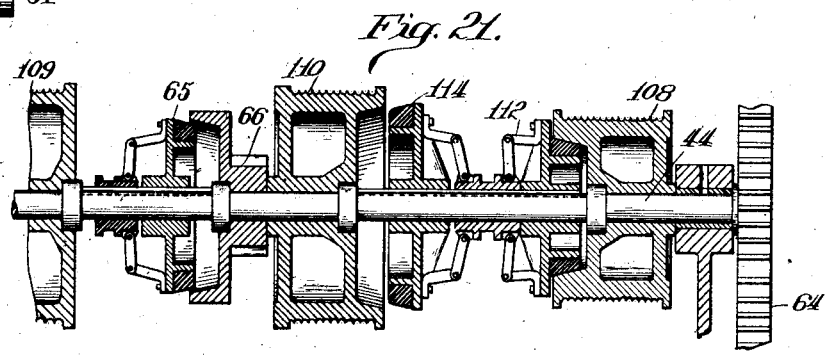
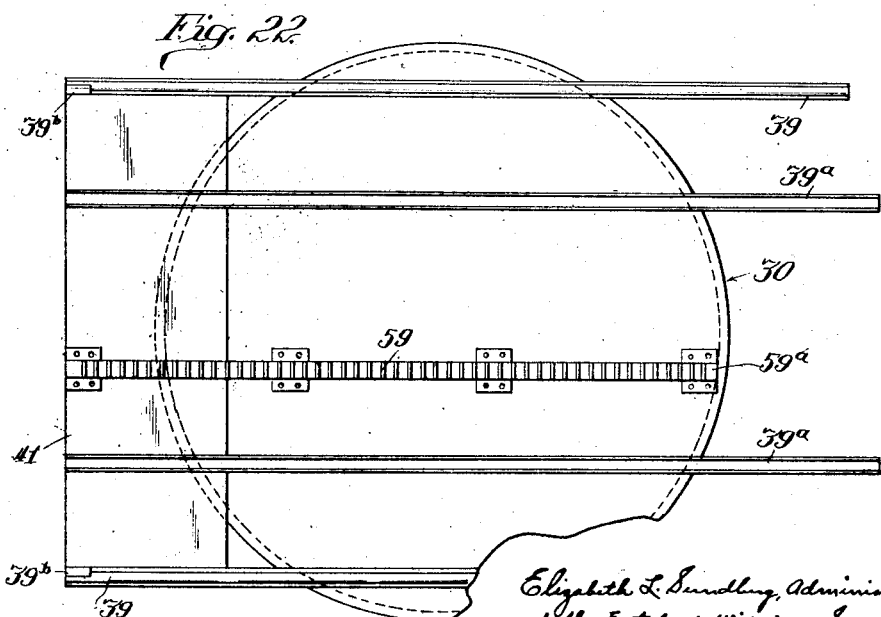

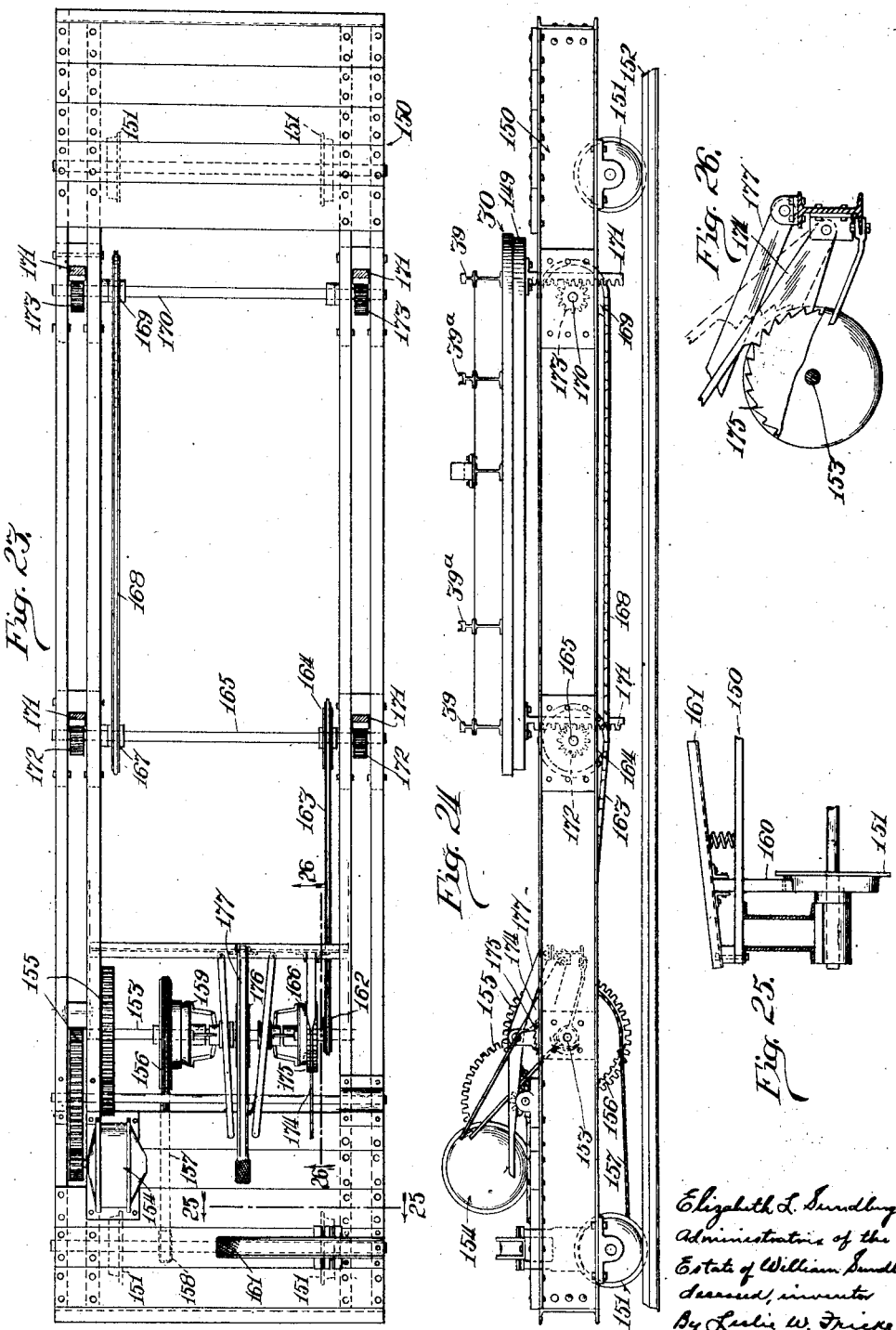

1,626,984

UNITED STATES PATENT OFFICE.

WILLIAM SUNDBERG, DECEASED, LATE OF CHICAGO, ILLINOIS; BY ELIZABETH L. SUNDBERG, ADMINISTRATRIX, OF CHICAGO, ILLINOIS, ASSIGNOR TO ELIZABETH L. SUNDBERG, TRUSTEE, OF CHICAGO, ILLINOIS.

BOX-CAR-UNLOADING APPARATUS.

Continuation of application Serial No. 331,561, filed October 18, 1919. This application filed December 16, 1922. Serial No. 607,311.

This application is a continuation of copending application Serial No. 331,561, filed October 18th, 1919, by William Sundberg, now deceased.

Among the objects of the invention the following may be noted:

The provision of apparatus of relatively simple construction, adapted to unload railroad cars of the box type, containing grain, coal, or other materials in bulk, in a minimum period of time and at a minimum cost;

The provision of apparatus so constructed that it may be readily installed in existing unloading plants without making extensive changes in such plants;

The provision of apparatus so constructed that it may be mounted upon a car equipped with standard gauge trucks and adapted to be run upon a track extending alongside of the track on which the cars to be unloaded are placed so that the apparatus may be placed opposite the respective adjacent side doors of the cars to be unloaded;

The provision of a car for supporting the unloading apparatus, which is preferably self-propelled;

The provision of a turn-table on the car and on which the unloading apparatus is mounted so that the apparatus may be run on a track located between two tracks on which cars to be unloaded may be placed, whereby the unloading apparatus may be swung around to operate in cars on either side;

The provision of means whereby the turntable may be raised or lowered, thus placing the apparatus at the desired height with respect to each individual car to be unloaded;

The provision of a frame for supporting the unloading apparatus which is slidably mounted on the turn-table in combination with means for moving the frame, whereby the forward end of the frame may be inserted through one of the side doors of a box car to position the unloading apparatus in the car, means also being provided for withdrawing the frame and the associated apparatus from the car;

The provision of means, preferably in the form of a flight conveyor carried on the under side of the frame, so arranged that it will drag the material from that portion of the car adjacent the door through which the apparatus is inserted so as to clear a pathway for the forward end of the frame as the latter is progressively moved into the car;

The provision of means adapted to remove the material in the respective ends of the car into the path of the flight conveyor, said means preferably including a pair of shovels adapted to be moved backwardly and forwardly in the car;

The provision of extensible supports for the shovels adapted to extend from opposite sides of the frame into the respective ends of the car, said extensible supports preferably being in the form of telescopic cylinders which may be extended by compressed air;

The provision of means whereby forward movement of the frame into the car to be unloaded is automatically checked and the air to the telescopic cylinders is automatically turned on;

The provision of means for operating the shovels, preferably including two sets of cables leading from suitable drums, one set being employed to pull the shovels back into the respective ends of the car, and the other set to pull the shovels forwardly to remove the material from the respective ends of the car into the path of the flight conveyor, the set of cables pulling the shovels back into the car also preferably being arranged so that the telescopic cylinders may be collapsed or drawn back into their initial positions when it is desired to withdraw the apparatus from the car;

The provision of pneumatic means, preferably carried on the forward extremities of the respective telescopic cylinders so that, as the cylinders are collapsed, any material left by the shovels in the respective ends of the car will be blown forwardly into the path of the flight conveyor; and The provision of pneumatic means preferably carried on the forward end of the frame so that, as the frame is withdrawn, any material left by the flight conveyor in the middle portion of the car will be blown out of the open door.

The invention consists in the novel constructions, arrangements and devices to be hereinafter described and claimed for carrying out the above stated objects and such other objects as will appear from the following description of certain preferred embodiments illustrated in the accompanying drawings, wherein—

Fig. 1 is a plan view of apparatus embodying the invention operatively positioned in a box car, the roof of the car having been removed, and certain parts of the apparatus having been omitted to avoid confusion;

Fig. 2 is a longitudinal sectional view, taken on the line 2—2 of Fig. 1;

Fig. 3 is a sectional view, on an enlarged scale, taken on the line 3—3 of Fig. 1;

Fig. 4 is a plan view of the apparatus shown in Fig. 3, the telescopic cylinders being in their collapsed or inoperative positions;

Fig. 5 is a sectional view taken on the line 5—5 of Fig. 4, showing the braking and holding means for certain of the drums;

Fig. 6 is a plan view of the parts shown in Fig. 5;

Fig. 7 is a sectional view taken on the line 7—7 of Fig. 3;

Fig. 8 is a sectional view, on an enlarged scale, taken on the line 8—8 of Fig. 7, showing certain parts of the means employed for automatically controlling the operation of the shovels;

Fig. 9 is a sectional view, on an enlarged scale, taken on the line 9—9 of Fig. 4;

Figs. 10 and 11 are sectional views, on an enlarged scale, taken on the lines 10—10 and 11—11, respectively, of Fig. 7;

Fig. 12 is a transverse sectional view, on an enlarged scale, through one of the castings from which the extensible telescopic shovel supports extend to opposite sides, being taken on the line 12—12 of Fig. 1;

Fig. 13 is a longitudinal sectional view, on an enlarged scale, of one of the telescopic shovel supports when in a collapsed condition;

Fig. 14 is a sectional view, on an enlarged scale, taken on the line 14—14 of Fig. 1, showing the means employed for limiting extensible movement of the cylinder sections;

Fig. 15 is a sectional view taken on the line 15—15 of Fig. 14;

Fig. 16 is a plan view of the extremity of one of the extensible shovel supports;

Fig. 17 is a side elevational view of the parts shown in Fig. 16;

Fig. 18 is a detail view showing the manner in which the pulling cables are attached to the shovels;

Fig. 19 is a sectional view taken on the line 19—19 of Fig. 18;

Fig. 20 is an elevational view of the drive shaft;

Fig. 21 is a sectional view, on an enlarged scale, of one end of the shaft carrying the several drums, said view being taken on the line 21—21 of Fig. 7;

Fig. 22 is a plan view of the turn-table on which the unloading apparatus is mounted;

Fig. 23 is a plan view of the car which supports the unloading apparatus;

Fig. 24 is a side elevational view of the supporting car; and

Figs. 25 and 26 are sectional views taken on the lines 25—25 and 26—26, respectively, of Fig. 23.

Like characters of reference designate like parts in the several views.

The apparatus will now be described in detail under appropriate headings and finally a brief statement of its mode of operation will be given.

The frame.

The apparatus is mounted on a turn-table 30 (Figs. 3, 22 and 24), the supporting means for which will be presently described. The frame comprises a pair of inverted U-shaped castings 31 (Fig. 3) which are held in spaced relationship by a plurality of transversely extending members 32, 33, 34, 35 and 36 (Fig. 4), horizontal brace rods 37 (Figs. 3, 7 and 9) being provided to tie the front and rear legs of the castings together. The rear end of the frame is provided with flanged wheels 38 which are adapted to operate on rails 39 provided on the turn-table. The forward end of the frame is provided with wheels 40 adapted to run on the floor of a box car and on channeled rails 39ᵃ provided on the turn-table. Counter-weights 41 (Fig. 22) are provided on the turn-table to balance the same when the frame is being moved to one side.

Means for moving frame into and out of a car.

A power shaft 42 and counter-shafts 43, 44, 45, 46, 47 and 48 (Figs. 3, 4, 7 and 11) are journaled in the frame, and a counter-shaft 49 is journaled in bearing blocks 50 adjustably mounted in the side castings of the frame. A gear 51 fixed on drive shaft 42 is in mesh with a pinion 52 connected with any suitable source of power, for example, a motor 53. A gear 54 fixed on drive shaft 42 is in mesh with a gear 55 fixed on shaft 43. A friction clutch 56 (Fig. 7) and a pinion 57 are provided on shaft 43, the clutch being fixed on the shaft and adapted to fix the pinion 57 thereto. The pinion 57 is in mesh with a gear 58 (see also Fig. 11) fixed on shaft 45, said gear being in mesh with a rack 59 attached to the turn-table. Drive shaft 42 rotates in a clockwise direction, and, therefore, when clutch 56 is thrown in, gear 58 will be driven also in a clockwise direction, and the frame will be moved forwardly, that is to say, to the right, having reference to Fig. 3, so it may be inserted through the adjacent side door of the box car.

In order to stop automatically forward movement of the frame, clutch 56 is connected to one end of a rope 60, (Fig. 4), the other end of said rope being connected to a lever 61 (Fig. 3). When the clutch is thrown in, lever 61 is moved into the dotted-line position. As the forward end of the frame approaches the inner side of the opposite door of the box car, the lower end of lever 61 strikes said door and further inward movement of the frame results in said lever being swung into the full-line position, thus automatically throwing out clutch 56.

A sprocket 62 (Figs. 3 and 4) fixed on drive shaft 42 is connected by a chain 63 with a sprocket 64 fixed on the shaft 44. A clutch 65 and a pinion 66 (Fig. 7) are provided on shaft 44, said pinion being fixed on said shaft when the clutch is thrown in. Pinion 66 is in mesh with gear 58 (Fig. 11). It will thus be seen, when clutch 65 is thrown in, that pinion 66 will be driven in a clockwise direction, with the consequent result that gear 58 will be driven in a counter-clockwise direction, the frame, in that case, being moved to the left.

Movement of the frame relative to the turn-table to the left is limited by stops 39ᵇ (Fig. 22) adapted to be engaged by the respective rear wheels 38, and to the right is limited by a stop 59ᵃ on the forward end of rack 59 adapted to be engaged by gear 58.

The flight conveyor.

Drive shaft 42 is provided with a clutch 67 and a pinion 68 (Figs. 4 and 20), said clutch, when thrown in, fixing said pinion to said shaft. Pinion 68 is connected by chain 69 with a driven member 70 fixed on shaft 46 (see also Fig. 3).

A pair of sprockets 71 is provided on the respective shafts 46, 47, 48 and 49 over which endless chains 72 travel, curved plates or flights 73 being attached to said chains to form a flight conveyor. The flights 73 are provided with oppositely extending stub shafts 74 (Figs. 9 and 10) on the extremities of which rollers 75 are mounted, the rollers of the lower run of the conveyor operating on horizontally extending angle irons 76 attached to the inner sides of the respective frame castings, while the rollers of the upper run of the conveyor travel on horizontally extending tracks 77 provided on said respective side castings, thus preventing sagging of the runs of the conveyor. Any slack which may develop in the conveyor may be eliminated by raising the bearings 50, which support the shaft 49 (Fig. 3).

The telescopic cylinders.

A pair of castings 78 (Figs. 1, 3, 4 and 9) extend transversely across the top of the frame and form the supports for the telescopic cylinders, one of which is shown in details in Figs. 12 to 15, inclusive. Each of these castings is formed with two parallel bores 79 extending from opposite ends thereof in which the cylinders are mounted, cylinders 80 being adapted to extend into the left end of the car, having reference to Figs. 1 and 2, and cylinders 81 being adapted to extend into the right end of the car. Each cylinder comprises interfitting sections 82, 82ᵃ, 82ᵇ, 82ᶜ and 82ᵈ. The connections between adjacent sections are the same as that between section 82 and casting 78 and only the latter will be described. Casting 78 is bored so as to form an inwardly, circumferentially extending shoulder 83, which, in co-operation with an outwardly, circumferentially extending shoulder 84 provided on section 82, forms a stop to limit outward movement of the section. A ring 85 threaded on the outer end of section 82 engages the forward end of casting 78 and limits inward movement of the section. The rear end of the section is provided with a piston ring 86 to form an air tight structure. The section is provided with a longitudinally extending groove 87 which is adapted to receive the inner end of a pin 87ᵃ carried by the casting 78, thereby preventing relative rotative movement of the section. After the respective sections of the telescopic cylinders have been nested in the bore 79, the inner end thereof is closed by a screw plug 88.

Means for operating the telescopic cylinders.

Mounted on the rear end of the frame is an air compressor 89 (Figs. 1, 3 and 4). Drive shaft 42 is provided with a loose sprocket 90 which is connected by a chain 91 with a sprocket 92 fixed to the compressor. Shaft 42 is also provided with a clutch 93 (Fig. 20) for fixing sprocket 90 thereto. A pipe 94 (Fig. 4) leads from the compressor into a receiving tank 95. A pipe 96 extends from said receiving tank to a manifold 97, the admission of air into said manifold being controlled by a valve 98 provided with an operating lever 99. Lever 99 is connected by an adjustable link 100 (Figs. 3 and 4) to the upper end of lever 61. When said levers are in the dotted-line positions (Fig. 3), valve 98 is closed and, when they are in the full-line positions, said valve is opened. The admission of air to the manifold 97, therefore, is automatically controlled. Pipes 101 (Fig. 4) extend from the manifold 97 to the chambers formed at the rear ends of the respective telescopic cylinders (see Fig. 13) by means of which air may be admitted to the respective cylinders and the cylinders on the opposite sides of the frame extended into the respective ends of the car.

Pipe fittings 102 (Figs. 9, 16 and 17) having valves 103 controlled by levers 104 are provided on the outer ends of the innermost sections of the respective cylinders. Levers 104 are provided with wheels 105 which strike against the car ends when the respective cylinders are extended. When levers 104 are in the full-line position (Fig. 17), valves 103 are closed, but, when said levers are in the dotted-line position, said valves are partially open, thus relieving to a certain extent the air pressure in the telescopic cylinders, the air escaping from valves 103 and passing through the respective hoses 106 attached thereto.

*The shovels and means for operating same.*

Drums 107, 108, 109 and 110 (Figs. 1, 4, 7 and 21) are loosely mounted on shaft 44. Clutches 111, 112, 113 and 114 (Figs. 7 and 21) are provided on shaft 44 for operatively connecting the respective drums thereto. Clutches 111 and 113 are operated by an L-shaped lever 115 pivoted at 115$^a$ to the frame, and clutches 112 and 114 are operated by a similar lever 116 pivoted to the frame at 116$^a$. Levers 115 and 116 are connected by links 117 and 118, respectively, to a common operating lever 119.

A shovel 120 (Figs. 1, 2 and 9) is associated with the telescopic supports 80, and a shovel 121 is associated with the telescopic supports 81.

Cables 122 (Figs. 1, 2 and 7) fastened at one end to drum 108 extend around sheaves 123 swingingly connected to one of the frame tie-rods 37, the other ends of said cables being attached to shovel 120. Cables 124 fastened at one end to drum 107 extend around sheaves 125 swingingly connected to the other frame tie-rod 37, the other ends of said cables being connected to shovel 121.

Cables 126 attached at one end to drum 110 run over sheaves 127, 128 and 129, (see also Fig. 3) attached to the frame, and extend over the telescopic cylinders 80 and sheaves 130 (Figs. 16 and 17) fixed to the outer ends of said cylinders, the other ends of said cables being attached to the upper side of the shovel 120. Cables 131 attached at one end to drum 109 run over sheaves 132, 133 and 134, attached to the frame, and extend over the telescopic cylinders 81 and sheaves 135 fixed to the outer ends of said cylinders, the other ends of said cables being attached to the upper side of shovel 121.

The construction of the shovels and the manner in which the respective sets of cables are attached thereto is illustrated in detail in Figs. 9, 10, 17, 18 and 19. Each shovel comprises a steel plate 136 reinforced along its upper edge with an angle iron 136$^a$ to which the cables extending over the telescopic cylinders are attached. The plate is reinforced along its lower edge by a bar 136$^b$. When lump coal and the like is to be handled, the shovels may be provided with forks 137 (Fig. 18). A pair of L-shaped members 138 are attached to each shovel in the manner shown in Fig. 19, the arms 138$^a$ thereof projecting through plate 136. Links 139 are pivotally connected at one end to the respective members 138, said links at the other end being attached to the cables running to the respective drums 107 and 108.

Clips 140 (Fig. 17) are provided on the cables extending over the sheaves attached to the outer ends of the telescopic cylinders so that the cylinders may be collapsed and the respective shovels pulled inwardly against the frame by winding up the cables on the drums 109 and 110.

The outer ends of the arms 115$^b$ and 116$^b$ of the respective levers 115 and 116 are bifurcated (Figs. 7 and 8) through which one of the respective sets of cables 122 and 124 operates. Said cables are provided with clips 141 and 142. Clips 141 are so positioned on said cables that, when the shovels reach the respective ends of the car being unloaded, they will engage and pull levers 115 and 116 into the full-line positions, see Fig. 7, lever 119 in that case being in its full-line position. Clips 142 are adapted to pass over the respective sheaves 123 and 125 and are so positioned on said cables that, when the shovels are drawn up closely against the respective sides of the frame, as shown in Fig. 9, they will engage and shift said clutch levers into the dotted-line positions, lever 119 in that case also being in its dotted-line position. This arrangement is for the purpose of providing for automatic operation of the shovels, as will be presently explained.

In order to prevent the various cables from unwinding too rapidly from the drums, counter-weighted levers 107$^a$, 108$^a$, 109$^a$ and 110$^a$ (Figs. 5 and 7), provided with brake shoes adapted to engage the rims of the respective drums, are pivoted on shaft 45.

The shovels are held firmly against the respective sides of the frame, as shown in Fig. 9, by pawls 109$^b$ and 110$^b$ (Figs. 5 and 6) pivoted to the under side of transverse frame member 34. Said pawls are connected by a transverse bar 110$^c$ so that both operate simultaneously and are adapted to engage ratchets provided on the rims of the respective drums 109 and 110. Pawl 109$^b$ is provided with an operating arm 109$^c$ equipped with a slidable counter-weight. Drums 109 and 110 rotate in a counter-clockwise direction when cables 126 and 131 are unwinding.

When said pawls are in engagement with the respective drum ratchets, unwinding of said cables is prevented.

*Pneumatic means for cleaning out car.*

As has been explained, the valve 103 (Figs. 16 and 17) in the fittings attached to the outer ends of the respective telescopic cylinders are partially opened when the extremities of said cylinders reach the respective ends of the car, the air escaping through the hoses 106. The hoses 106, after the car has been substantially emptied of its contents, hang down, see Fig. 2, and terminate a short distance above the car floor. These hoses are provided with forwardly projecting nozzles 143. By this arrangement, any material remaining in the car will be blown ahead and into the path of the flight conveyor as the telescopic cylinders are collapsed and the hoses are moved toward the center of the car.

A pipe 144 (Figs. 3, 4 and 9) controlled by a valve 145 extends from tank 95 to a header 146. Pipes 147 extend from the extremities of the header 146 and terminate in nozzle 148 which projects toward the rear end of the frame. When the frame is to be withdrawn from the car, valve 145 is opened, consequently air discharges through nozzles 148, blowing any material out of the car which may have been left by the flight conveyor.

*The car supporting the turn-table.*

The turn-table 30 is rotatably mounted upon a platform 149 (Figs. 3 and 24). Platform 149 is mounted on a car 150 provided with wheels 151 arranged to run upon rails 152 of a standard gauge car track. The car 150 is provided with a power shaft 153 connected with any suitable source of power, for example, to a reversible motor 154 by a train of gears 155. Loosely mounted on shaft 153 is a sprocket 156 connected by a chain 157 with a sprocket 158 fixed to one of the car axles. A clutch 159 is provided on shaft 153 for operatively connecting sprocket 156 thereto. When clutch 159 is thrown in, the mechanism described will propel the car in one direction and, when the motor is reversed, it will be propelled in the opposite direction. The car is provided with a brake shoe 160 (Fig. 25) adapted to engage one of the car wheels, said shoe being operated by a foot lever 161.

*The means for raising and lowering the turn-table.*

A sprocket 162, loose on power shaft 153, is connected by a chain 163 to a sprocket 164 fixed on a counter-shaft 165 journaled in the car frame. A clutch 166 is provided on shaft 153 for connecting sprocket 162 thereto. A sprocket 167 fixed to shaft 165 is connected by a chain 168 to a sprocket 169 fixed on a counter shaft 170 also journaled in the car frame. Platform 149 is provided with two pair of vertically extending racks 171, one pair of said racks being in mesh with pinions 172 fixed to shaft 165, the other pair being in mesh with pinions 173 fixed to shaft 170. When power shaft 153 is rotated in a counter-clockwise direction, shafts 165 and 170 will also rotate in a similar direction, and the platform 149 will be raised. The platform is held in the desired elevated position by a lever 174 having teeth adapted to engage a ratchet wheel 175 fixed on the shaft 153 (Fig. 26). The shaft 153 is provided with a brake drum 176 which is engaged by a foot lever 177. When it is desired to lower the platform, the operator stands upon the lever 177 and raises the lever 174, thus permitting the platform to descend. If it is difficult to disengage the teeth of the lever 174 from ratchet 175, motor 154 may be started to turn shaft 153 slightly in a counter-clockwise direction, thus enabling the operator to raise the lever.

*Operation.*

The car supporting the apparatus is run on a track extending alongside the track on which the cars to be unloaded are placed. As the unloading apparatus is mounted on a turn-table, it will be obvious that the car supporting the apparatus may be run on a track located between two tracks on each of which cars to be unloaded are placed. The cars to be unloaded are spotted over the track hoppers (not shown) so that material removed through one of the side doors of the cars will flow into the respective hoppers.

Assuming that the unloading mechanisms are in the positions shown in Fig. 4 and the frame supporting said mechanisms rests entirely upon the turn-table with the forward end of the frame pointed toward the right, having reference to Fig. 3, clutch 159 (Fig. 23) on the car is thrown in and motor 154 is operated to bring the unloading apparatus opposite the adjacent side door of the car to be unloaded. Clutch 159 is then thrown out. Unless the rails 39 and 39ᵃ on the turn-table are at the desired level, platform 149 is raised or lowered vertically, in the manner heretofore described, to bring the upper surface of said rails substantially level with the car floor. Current to the motor 154 may now be turned off.

Assuming that all the clutches associated with the unloading apparatus are inoperative and all the valves controlling the air are closed, current to motor 53 (Figs. 1 and 4) is turned on and drive shaft 42 is rotated in a clockwise direction. Clutch 93 (Fig. 20) is next thrown in, connecting the air compressor with drive shaft 42, air being forced into tank 95 and pipe 96 as far as valve 98. Clutch 67 (Figs. 4 and 20) is next thrown in, thus connecting shaft 46 with drive shaft 42, both rotating in a clockwise direction and causing the flight conveyor to travel in a similar direction. Clutch 56 (Fig. 7) on shaft 43 is now thrown in, connecting said shaft with drive shaft 42. As shaft 43 is driven in a counter-clockwise direction (Fig. 11) and is connected with shaft 45, the latter is driven in a clockwise direction, gear 58 fixed thereto travelling to the left over rack 59 on the turn-table. Thus the frame carrying the unloading apparatus is moved forwardly on the turn-table and inserted through the adjacent side door of the car. The flight conveyor being in operation, the material in that portion of the car adjacent said door is removed from the car and flows into the track hopper as the frame progressively moves to the left into the car. Throwing in clutch 56 pulls rope 60 rearwardly and lever 61 (Fig. 3) is moved into its dotted-line position. As the forward end of the frame approaches the inner side of the opposite door of the car, the lower end of the lever 61 strikes said door and further inward movement of the frame results in said lever being swung into its full-line position, thus automatically throwing out clutch 56 and stopping movement of the frame.

Movement of the lever 61 into its full-line position also opens valve 98, air being admitted to manifold 97; the pipes 101 and the two sets of telescopic cylinders being automatically extended into the respective ends of the car.

As these cylinders are extended, cables 126 and 131 unwind from the respective drums 110 and 109, the pawls 110$^b$ and 109$^b$ (Fig. 5 and 6) having previously been disengaged from the respective ratchets on said drums. When the telescopic cylinders reach the respective ends of the car, the respective wheels 105 (Fig. 17) abut against the car ends and they move into the dotted-line position, thus partially opening valves 103, relieving the pressure in the telescopic cylinders to a certain extent and checking further inward movement of the cylinders, the air escaping through hoses 106.

Lever 119 (Fig. 7) is now moved into its dotted-line position and clutches 113 and 114 are moved into engagement with the respective drums 109 and 110, thus fixing said drums to shaft 44 which is operating in a clockwise direction. Cables 126 and 131 are wound upon the respective drums and the shovels 120 and 121 are pulled from their positions of rest against the respective sides of the frame, as shown in Fig. 9, over the material and into the respective ends of the car, see Figs. 1 and 2, cables 122 and 124 unwinding from the respective drums 108 and 107. The level of the material in the car at this time is substantially as indicated in dotted-lines in Fig. 2. Lever 119 is then moved to its full-line position, thus disengaging clutches 113 and 114 from the respective drums 109 and 110 and throwing in clutches 111 and 112 into engagement with the respective drums 107 and 108. Drums 107 and 108 now wind up the respective cables 124 and 122, thus pulling the respective shovels toward the frame, the material in front of said shovels being pulled into the path of the flight conveyor. As the shovels are pulled toward the frame by the respective cables 124 and 122, the cables on the drums 109 and 110 are unwound.

It will be noted from Figs. 9 and 10 that the links 139, connecting the cables 124 and 122 to the respective shovels, are attached to the respective shovels somewhat above the horizontal axis of the shovels. A pull upon these cables, therefore, results in the shovels being moved into a substantially vertical position, the links 139 engaging the under side of the arms 138$^a$ which at this time are in a substantially horizontal position.

By swinging the lever 119, therefore, to the left and to the right, the respective shovels may be pulled backwardly and forwardly in the respective ends of the car until substantially all of the material therein is removed into the path of the flight conveyor. By providing clips 141 and 142 properly positioned on the respective cables 122 and 124, the shovels may be automatically moved backwardly and forwardly in the car.

After substantially all of the material has been removed from the ends of the car by the respective shovels, the shovels are pulled back into the ends of the car for the last time by winding up the cables 126 and 131 on the respective drums 110 and 109, resulting in clips 140 (Fig. 17) engaging the respective housings which support the respective sheaves 135 and 130 on the outer ends of the respective telescopic cylinders; and, continued rotation of the drums 110 and 109 will result in the telescopic cylinders being collapsed and the shovels returned to their initial positions against the respective sides of the frame, as shown in Fig. 9. Lever 119 is then moved into its full-line position to cause drums 107 and 108 to rotate and wind up the slack cables 124 and 122.

As the telescopic cylinders are collapsed, the air therein is forced at a high velocity out of the nozzles 143 (Fig. 17), attached to the lower ends of the respective hoses 106, which at this time hang in a vertical position, and any material remaining in the respective ends of the car is blown ahead of the nozzles and into the path of the flight conveyor.

It is now desirable to close valves 103 controlling the escape of air from the respective telescopic cylinders, which makes it necessary to move the respective levers 104 and wheels 105 from their dotted-line positions (Fig. 17) into their full-line positions. This may be accomplished by providing levers 178 and 179 (Fig. 4) pivoted on the frame, their outer ends being adapted to engage the respective wheels 105. The inner ends of levers 178 are attached to a rope 180, the rear end of said rope being fixed to the rear end of the frame, the other end of said rope extending over a sheave at the forward end of the frame and being attached to a weight 181. The inner ends of levers 179 are attached to a rope 182 fastened at its rear end to the rear end of the frame, its other end extending over a sheave at the forward end of the frame and being connected to a weight 183. A pull upon rope 180 will result in levers 178 being swung in a clockwise direction, and a pull upon rope 182 will result in levers 179 being swung in a counter-clockwise direction, thus pushing the respective wheels 105 into the full-line position shown in Fig. 17 and closing the respective valves 103.

Valve 145 (Fig. 4) is now opened and air admitted to pipe 144, header 146 and hoses 147 (Fig. 3). Clutch 65 (Figs. 7 and 21) is now thrown in, which connects shaft 44 rotating in a clockwise direction with shaft 45, causing the latter to rotate in a counter-clockwise direction. Gear 58, therefore, moves backwardly relative to the rack 59 fixed to the turn-table, and the frame and unloading apparatus are withdrawn from the car. As the apparatus is withdrawn from the car, the air discharges through nozzles 148 attached to the hoses 147 and any material that may have been left in the middle portion of the car by the flight conveyor is blown out of the car.

When the apparatus is entirely withdrawn from the car, clutch 65 is thrown out, stopping further backward movement of the frame, clutch 67 is thrown out to stop movement of the flight conveyor, clutch 93 is thrown out to stop the air compressor and motor 53 is stopped. Air valve 145 is closed and valve 98 is closed by pulling on the rope 60, moving lever 61 to its dotted-line position. The unloading apparatus is now at rest and ready to be moved to the next car to be unloaded. After all the cars on the track at one side of the apparatus have been unloaded, the turn-table may be swung around, and the cars on the track on the opposite side unloaded.

The apparatus is very simple in construction considering what it accomplishes, and it will unload a car in a minimum period of time. Since the unloading apparatus and the car on which it is mounted may be operated by a single person, the saving in labor is very noteworthy.

It is not intended to limit the invention to the details of construction shown and described except only in so far as certain of the appended claims are specifically so limited, as it will be obvious that numerous modifications may be made without departing from the principles of the invention.

I claim:

1. In box car unloading apparatus, the combination of means adapted to enter through one of the side doors of a car for removing material from that portion of the car adjacent said door, and means associated with said first mentioned means and insertable through said door therewith for moving material from one end of the car into the field of operation of said first mentioned means.

2. In box car unloading apparatus, the combination of means adapted to enter through one of the side doors of a car for removing material from that portion of the car adjacent said door, and means associated with the opposite sides of said first mentioned means and insertable through said door therewith for moving material from the respective ends of said car into the field of operation of said first mentioned means.

3. In box car unloading apparatus, the combination of a frame adapted to be inserted through one of the side doors of a car, conveying means associated with said frame for removing material from that portion of the car adjacent said door, and means associated with said frame and insertable through said door therewith for moving material from one end of the car into the path of said conveyor.

4. In box car unloading apparatus, the combination of a frame adapted to be inserted through one of the side doors of a car, conveying means associated with said frame for removing material from that portion of the car adjacent said door, and means associated with the opposite sides of said frame and insertable through said door therewith for moving material from the respective ends of said car into the path of said conveyor.

5. In box car unloading apparatus, the combination of a frame adapted to be inserted through one of the side doors of a car, conveying means associated with said frame for removing material from that portion of the car adjacent said door, extensible supporting means adapted to extend from opposite sides of said frame into the respective ends of said car, and means associated with said supporting means for moving the material from the respective ends of the car into the path of said conveying means.

6. In box car unloading apparatus, the combination of a frame adapted to be inserted through one of the side doors of a car, conveying means associated with said frame for removing material from that portion of the car adjacent said door, extensible supporting means adapted to extend from opposite sides of said frame into the respective ends of said car, and scoop means associated with said supporting means for moving the material from the respective ends of the car into the path of said conveyor.

7. In box car unloading apparatus, the combination of a frame adapted to be inserted through one of the side doors of a car, conveying means associated with said frame for removing material from that portion of the car adjacent said door, extensible supporting means adapted to extend from opposite sides of said frame into the respective ends of said car, scoop means associated with said supporting means, and means for moving said scoop means backwardly and forwardly in said car, whereby the material in the respective ends of said car may be moved into the path of said conveyor.

8. In box car unloading apparatus, the combination of a supporting structure adapted to run upon a track adjacent that on which the car to be unloaded is placed, means carried by said structure and adapted to enter through the adjacent side door of said car for removing material from that portion of the car adjacent said door, and means associated with said first mentioned means and insertable through said door therewith for moving material from one end of the car into the field of operation of said first mentioned means.

9. In box car unloading apparatus, the combination of a supporting structure adapted to run upon a track adjacent that on which the car to be unloaded is placed, a frame slidably carried by said structure and adapted to be inserted through the adjacent side door of said car, conveying means associated with said frame for removing material from that portion of the car adjacent said door, and means associated with said frame and insertable through said door therewith for moving material from one end of the car into the path of said conveyor.

10. In box car unloading apparatus, the combination of a supporting structure adapted to run upon a track adjacent that on which cars to be unloaded are placed, means associated with said structure to propel the same, means carried by said structure and adapted to enter through the adjacent side door of a car for removing material from that portion of the car adjacent said door, and means associated with said first mentioned means and insertable through said door therewith for moving material from one end of the car into the field of operation of said first mentioned means.

11. In box car unloading apparatus, the combination of a supporting structure adapted to run upon a track adjacent that on which cars to be unloaded are placed, means associated with said structure to propel the same, a frame slidably carried by said structure and adapted to be inserted through the adjacent side door of a car, conveying means associated with said frame for removing material from that portion of the car adjacent said door, and means associated with said frame and insertable through said door therewith for moving material from one end of the car into the path of said conveyor.

12. In box car unloading apparatus, the combination of a supporting structure vertically adjustable means slidably associated with said structure and adapted to enter through the adjacent side door of a car for removing material from that portion of the car adjacent said door, and means associated with said first mentioned means for moving material from one end of the car into the field of operation of said first mentioned means.

13. In box car unloading apparatus, the combination of a supporting structure, a vertically adjustable frame slidably carried by said structure and adapted to be inserted through the adjacent side door of a car, conveying means associated with said frame for removing material from that portion of the car adjacent said door, and means associated with said frame for moving material from one end of the car into the path of said conveyor.

14. In box car unloading apparatus, the combination of a supporting structure, a platform carried by said structure, means to raise or lower said platform, means slidably associated with said platform and adapted to enter through the adjacent side door of a car for removing material from that portion of the car adjacent said door, and means associated with said second mentioned means for moving material into the field of operation of said second mentioned means.

15. In box car unloading apparatus, the combination of a supporting structure, a platform, racks attached to said platform, pinions carried by said structure and in mesh with said respective racks, means to drive said pinions, means slidably associated with said platform and adapted to enter through the adjacent side door of a car for removing material from that portion of the car adjacent said door, and means associated with said second mentioned means for moving material into the field of operation of said second mentioned means.

16. In a box car unloading apparatus, the combination of a supporting structure adapted to run upon a track adjacent that on which cars to be unloaded are placed, means associated with said structure to propel the same, a platform carried by said structure, means to raise or lower said platform, means slidably associated with said platform and adapted to enter through the adjacent side door of a car for removing material from that portion of the car adjacent said door, and means associated with said third mentioned means for moving material into the field of operation of said third mentioned means.

17. In box car unloading apparatus, the combination of a supporting structure adapted to run upon a track adjacent that on which cars to be unloaded are placed, a power shaft on said structure, means connected with said shaft and adapted to propel said structure, a platform carried by said structure, means connected with said shaft and adapted to raise or lower said platform, means slidably associated with said platform and adapted to enter through the adjacent side door of a car for removing material from that portion of the car adjacent said door, and means associated with said third mentioned means for moving material into the field of operation of said third mentioned means.

18. In box car unloading apparatus, the combination of a supporting structure adapted to be placed between two tracks on which cars to be unloaded may be placed, a turn-table mounted on said structure, means slidably associated with said turn-table and adapted to enter through one of the side doors of a car, for removing material from that portion of the car adjacent said door, and means associated with said first mentioned means for moving material from one end of the car into the field of operation of said first mentioned means.

19. In box car unloading apparatus, the combination of a supporting structure adapted to be placed between two tracks on which cars to be unloaded may be placed, a turn-table mounted on said structure, a frame slidably mounted on said turn-table and adapted to enter through one of the side doors of a car, conveyor means carried by said frame for removing material from that portion of the car adjacent said door, and means associated with said frame for moving material from one end of the car into the field of operation of said conveyor means.

20. In box car unloading apparatus, the combination of a supporting structure, a frame mounted on said structure and adapted to be inserted through one of the side doors of a car, an endless conveyor on the under side of said frame for moving material from the car out of said door, means for driving said conveyor, tracks on said frame substantially parallel with the upper and lower runs of said conveyor, and rollers on said conveyor and adapted to run upon said tracks, for the purpose specified.

21. In box car unloading apparatus, the combination of a supporting structure, a frame mounted on said structure, and adapted to be inserted through one of the side doors of a car, a flight conveyor on the under side of said frame for moving material from the car out of said door, means for driving said conveyor, means for moving said frame into said car, means for automatically stopping movement of said frame when it is operatively positioned in said car, and means associated with said frame for moving material from the respective ends of said car into the field of operation of said conveyor.

22. In box car unloading apparatus, the combination of a supporting structure, a frame mounted on said structure, means whereby said frame may be moved on said structure and inserted through one of the side doors of a car, conveying means associated with said frame for removing material from that portion of the car adjacent said door, and means associated with said frame and insertable through said door therewith for moving material from one end of the car into the path of said conveyor.

23. In box car unloading apparatus, the combination of means adapted to be inserted through one of the side doors of a car for removing material from that portion of the car adjacent said door, extensible supporting means carried by said first-named means and adapted to extend into one end of the car, and means associated with said supporting means for moving material from the end of the car into the field of operation of said first-named means.

24. In box car unloading apparatus, the combination of a frame adapted to be inserted through one of the side doors of a car, conveying means carried by said frame for removing material from that portion of the car adjacent said door, extensible supporting means carried by said frame and adapted to extend into one end of the car, and means associated with said supporting means for moving material from the end of the car into the path of said conveying means.

25. In box car unloading apparatus, the combination of a frame adapted to be inserted through one of the side doors of a car, conveying means carried by said frame for removing material from that portion of the car adjacent said door, extensible supporting means carried by said frame and adapted to extend into one end of the car, and scoop means associated with said supporting means for moving material from the end of the car into the path of said conveying means.

26. In box car unloading apparatus, the combination of a frame adapted to be inserted through one of the side doors of a car, conveying means carried by said frame for removing material from that portion of the car adjacent said door, extensible supporting means carried by said frame and adapted to extend into one end of the car, scoop means associated with said supporting means, and means for moving said scoop means backwardly and forwardly in said car, whereby the material in the end of said car may be moved into the path of said conveyor.

27. In box car unloading apparatus, the combination of means adapted to be inserted through one of the side doors of a car for removing material from that portion of the car adjacent said door, telescopic supporting means carried by said first-named means and adapted to extend into one end of the car, pneumatic means for extending said supporting means, and means associated with said supporting means for moving material from the end of the car into the field of operation of said first-named means.

28. In box car unloading apparatus, the combination of a frame adapted to be inserted through one of the side doors of a car, conveying means associated with said frame for removing material from that portion of the car adjacent said door, telescopic supporting means carried by said frame and adapted to extend into the respective ends of said car, and means associated with said supporting means for removing the material from the respective ends of the car into the path of said conveyor.

29. In box car unloading apparatus, the combination of a frame adapted to be inserted through one of the side doors of a car, conveying means associated with said frame for removing material from that portion of the car adjacent said door, telescopic cylinders carried on the respective sides of said frame, pneumatic means for extending said cylinders into the respective ends of said car, and means associated with said cylinders for removing the material from the respective ends of the car into the path of said conveyor.

30. In box car unloading apparatus, the combination of a frame adapted to be inserted through one of the side doors of a car, conveying means associated with said frame for removing material from that portion of the car adjacent said door, telescopic supporting means carried by said frame and adapted to extend into the respective ends of said car, means for automatically stopping movement of said supporting means when the latter are in operative position in the car, and means associated with said supporting means for removing the material from the respective ends of the car into the path of said conveyor.

31. In box car unloading apparatus, the combination of a frame adapted to be inserted through one of the side doors of a car, conveying means associated with said frame for removing material from that portion of the car adjacent said door, telescopic cylinders carried on the respective sides of said frame, pneumatic means for extending said cylinders into the respective ends of said car, means for automatically stopping movement of said cylinders when the latter are in operative position in the car, and means associated with said cylinders for removing the material from the respective ends of the car into the path of said conveyor.

32. In box car unloading apparatus, the combination of a supporting structure, a frame mounted on said structure, means whereby said frame may be moved relative to said structure and inserted through one of the side doors of a car, extensible supporting means carried by said frame and adapted to extend into one end of the car, means associated with said supporting means for removing material from the end of the car into the vicinity of said door, and means whereby movement of the frame into the car is automatically stopped and said supporting means is automatically extended.

33. In box car unloading apparatus, the combination of a supporting structure, a frame mounted on said structure, means whereby said frame may be moved on said structure and inserted through one of the side doors of a car, conveying means associated with said frame for removing material from that portion of the car adjacent said door, extensible supports associated with said frame and adapted to extend into the respective ends of the car, means associated with said supports for removing material from the respective ends of the car into the path of said conveying means, and means whereby movement of the frame into the car is automatically stopped and said supports are automatically extended.

34. In box car unloading apparatus, the combination of a supporting structure, a frame mounted on said structure, means whereby said frame may be moved on said structure and inserted through one of the side doors of a car, conveying means associated with said frame for removing material from that portion of the car adjacent said door, telescopic cylinders associated with said frame and adapted to extend into the respective ends of the car, pneumatic means for extending said cylinders, means associated with said cylinders for removing material from the respective ends of the car into the path of said conveying means, and means whereby movement of the frame into the car is automatically stopped and the air to said cylinders is automatically turned on.

35. In box car unloading apparatus, the combination of a frame adapted to be inserted through one of the side doors of a car, drums on said frame, conveying means associated with said frame for removing material from that portion of the car adjacent said door, extensible supporting means adapted to extend from opposite sides of said frame into the respective ends of said car, scoops associated with said respective supporting means, cables extending from said scoops to said drums, and cables extending from said drums over said supporting means to said scoops.

36. In box car unloading apparatus, the combination of a frame adapted to be inserted through one of the side doors of a car, drums on said frame, conveying means associated with said frame for removing material from that portion of the car adjacent said door, extensible supporting means adapted to extend from opposite sides of said frame into the respective ends of said car, scoops associated with said respective supporting means, cables extending from said scoops to said drums, cables extending from said drums over said supporting means, and means whereby said drums are operated automatically and said scoops drawn backwardly and forwardly in said car, for the purpose specified.

37. In box car unloading apparatus, the combination of means insertable through one of the side doors of a car and adapted to remove material from that portion of the car adjacent said door, scoop means adapted to remove material from one end of the car into the field of operation of said first mentioned means, means for drawing said scoop means backwardly and forwardly in the end of the car, and means for automatically reversing the travel of said scoop means.

38. In box car unloading apparatus, the combination of a frame adapted to be inserted through one of the side doors of a car, conveying means associated with said frame for removing material from the car, and means including nozzles carried on the forward end of the frame for discharging air under pressure, whereby any material left in the car in the vicinity of said conveying means may be blown out of the car.

39. In box car unloading apparatus, the combination of a frame adapted to be inserted through one of the side doors of a car, conveying means associated with said frame for removing material from that portion of the car adjacent the door, means adapted to be moved backwardly and forwardly for removing material from the respective ends of the car into the path of said conveying means, and pneumatic means including discharge nozzles associated with the respective second mentioned means for discharging air under pressure, whereby material left in the respective ends of the car by said second mentioned means may be blown toward said conveying means.

40. In box car unloading apparatus, the combination of a frame adapted to be inserted through one of the side doors of a car, conveying means associated with said frame for removing material from that portion of the car adjacent said door, extensible telescopic cylinders associated with said frame and adapted to extend into the respective ends of the car, pneumatic means for extending said cylinders, means associated with said cylinders for removing material from the respective ends of the car into the path of said conveying means, hoses provided with discharge nozzles connected to the respective outer ends of said cylinders whereby air under pressure will be discharged through said nozzles as said cylinders are collapsed and material left in the respective ends of the car by said third mentioned means will be blown toward said conveying means, and pneumatic means including hoses provided with discharge nozzles carried by the forward end of said frame, whereby any material left in the car by said conveying means will be blown out of the door as the frame is withdrawn.

41. In box car unloading apparatus, the combination of a supporting structure, a frame slidably mounted on said structure and adapted to be inserted through one of the side doors of a car, means for moving said frame into the car, and means for automatically stopping movement of the frame when it is fully inserted in the car.

42. In box car unloading apparatus, the combination of a supporting structure, a frame slidably mounted on said structure and adapted to be inserted through one of the side doors of a car, means controlled by an operating member for moving said frame into the car, a member carried by said frame and adapted to be actuated when said frame is fully inserted in the car, and means connecting said operating and actuating members, for the purpose specified.

43. In box car unloading apparatus, the combination of a supporting structure adapted to be inserted through one of the side doors of a car, extensible supporting means carried by said structure and adapted to extend into one end of the car, and means connected to said supporting means for removing material from the end of the car into the vicinity of said door.

44. In box car unloading apparatus, the combination of a supporting structure adapted to be inserted through one of the side doors of a car, extensible pneumatically operated supporting means carried by said structure and adapted to extend into one end of the car, and means connected to said supporting means for removing material from the end of the car into the vicinity of said door.

45. In box car unloading apparatus, the combination of a supporting structure, a frame carried by said structure and adapted to be inserted through one of the side doors of a car, means controlled by an operating member for moving said frame into the car, extensible supporting means carried by said frame and adapted to extend into one end of the car, means controlled by an operating member for extending said supporting means, a member carried by said frame and adapted to be actuated when said frame is fully inserted in said car, and means connecting said operating members with said actuating member, for the purpose specified.

46. In box car unloading apparatus, the combination of a supporting structure, a frame slidably mounted on said structure and adapted to be inserted through one of the side doors of a car, means for moving said frame into the car, extensible supporting means carried by said structure and adapted to extend into one end of the car, and means automatically operable upon said frame being fully inserted in the car for extending said supporting means.

47. In box car unloading apparatus, the combination of a supporting structure adapted to be inserted through one of the side doors of a car, drums on said structure, extensible supporting means carried by said structure and adapted to extend into one end of the car, scoop means, cable means connected to said scoop means and certain of said drums, and cable means connected to the other of said drums and extending over said supporting means, whereby said scoop means may be drawn backwardly and forwardly in the end of the car to remove the material in the end of the car into the vicinity of the car door.

48. In box car unloading apparatus, the combination of a supporting structure adapted to be inserted through one of the side doors of a car, drums on said structure, extensible supporting means carried by said structure and adapted to extend into one end of the car, scoop means, cable means connected to said scoop means and certain of said drums, cable means connected to the other of said drums and extending over said supporting means and being connected to said scoop means whereby said scoop means may be drawn backwardly and forwardly in the end of the car, and means automatically operable upon the scoop means reaching either end of its excursion for reversing the operation of the drums and causing the scoop means to travel in the opposite direction.

49. In box car unloading apparatus, the combination of a supporting structure adapted to be inserted through one of the side doors of a car, extensible supporting means carried by said structure and adapted to extend into one end of the car, means for extending and contracting said supporting means, means carried by said supporting means for removing material from the end of the car into the vicinity of said door, and pneumatic means including nozzles carried by said supporting means for discharging air under pressure as said supporting means is contacted, for the purpose specified.

50. In box car unloading apparatus, the combination of a supporting structure adapted to be inserted through one of the side doors of a car, extensible supporting means carried by said structure and adapted to extend into one end of the car, means for extending said supporting means, a scoop, means for drawing said scoop from the vicinity of the car door into the end of the car, and means for pulling the scoop from the end of the car towards said door, said last named means also serving to collapse said supporting means.

51. A car unloading machine, comprising in combination a frame adapted to be inserted transversely of the car through the side door thereof, an extensible boom carried by the end portion of the frame, means for extending said boom longitudinally of the car, a scraper, and means for moving said scraper back and forth along said boom for moving the contents of the car toward the side door of the car.

52. A car unloading machine, comprising in combination a frame, means for moving one end of said frame into the side door of the car, a boom carried by the end portion of the frame and adapted to be extended therefrom longitudinally of the car, and discharge means reciprocable along the boom for moving the contents of the car toward the side door of the car.

53. A car unloading machine, comprising in combination a frame adapted to be inserted transversely of the car through the side door thereof, an extensible boom carried by the end portion of the frame and adapted to be extended therefrom longitudinally of the car, a sheave revolubly mounted on the end portion of said boom, cable means extending about said sheave, a scraper connected with said cable means, and means for reciprocating said cable means for drawing the scraper back and forth along the boom for moving the contents of the car toward the side door of the car.

54. A car unloading machine, comprising in combination a frame adapted to be inserted transversely of the car through the side door thereof, an extensible boom carried by the end potion of the frame and adapted to be extended therefrom longitudinally of the car, a scraper, a motor, and means driven by the motor for extending said boom toward the end of the car and then for moving the scraper back and forth along the boom.

55. A car unloading mechine, comprising in combination a frame adapted to be inserted transversely of the car through the side door thereof, an extensible boom carried by the end portion of the frame and adapted to be extended therefrom longitudinally of the car, a scraper, a motor, and means driven by the motor for moving said frame into the car, for extending said boom toward the end of the car, and then for moving the scraper back and forth along the boom.

56. A car unloading machine, comprising in combination a frame adapted to be inserted transversely of the car through the side door thereof, an extensible boom carried by the end portion of the frame and adapted to be extended therefrom longitudinally of the car, a scraper, a motor, and means driven by the motor for moving said frame into and out of the car, for moving said boom into and out of extended position in the car, and for moving the scraper back and forth along the boom.

57. A car unloading machine, comprising in combination a discharge element adapted to be introduced into the car, an extensible carrying structure for the same, a motor, and means driven by said motor for successively extending the carrying structure, reciprocating the discharge element along the extended carrying structure, and contracting the carrying structure.

ELIZABETH L. SUNDBERG,
*Administratrix of William Sundberg, Deceased.*